May 16, 1967 KARL-HEINZ POHL 3,320,483

SUPPORT MEMBER FOR CARD-EDGE TYPE CONNECTORS

Filed March 11, 1966 3 Sheets-Sheet 1

INVENTOR
K-H. POHL
BY [signature]
ATTORNEY

May 16, 1967 KARL-HEINZ POHL 3,320,483
SUPPORT MEMBER FOR CARD-EDGE TYPE CONNECTORS
Filed March 11, 1966 3 Sheets-Sheet 3

United States Patent Office 3,320,483

Patented May 16, 1967

3,320,483

SUPPORT MEMBER FOR CARD-EDGE TYPE CONNECTORS

Karl-Heinz Pohl, Matawan, N.J., assignor to Bell Telephone Laboratories, Incorporated, New York, N.Y., a corporation of New York Filed Mar. 11, 1966, Ser. No. 533,544

9 Claims. (Cl. 317—99)

This invention relates to methods for mounting electrical connector blocks in aligned relation to arrays of electronic components mounted on boards contained in frame carriers or housings. In particular, the invention concerns a structure for fastening and supporting on such housings a large number of connector blocks for slide-mounted plug-in type modules such as printed circuit boards.

In the assembling of electronic circuit packages during production, such as printed circuit boards into groupings mounted in grooved frames, one of the most time-consuming steps involves fastening the electrical connector blocks in end relation to each circuit board. As is well known, the large arrays of electronic circuitry employed in computers, radars and electric switching systems, for example, require for each item of equipment, numerous circuit mounting frames, each one of which may require two dozen or more connector blocks. Typically, these blocks are mounted with screw-fastened metal brackets, spring-loaded retainers on the frame or spring fasteners on the connector block itself. Within the mount, the blocks sometimes require a degree of leeway or "float" so that the board on insertion will engage the block and guide it into correct alignment with the circuit board contact fingers. Frequently also, the block terminal must be protected from dislodgement or other interference that occurs in closely packed frames.

Lacking in the prior art, insofar as applicant is aware, is an inexpensive connector block support that allows quick, easy installation of both block and support, that mounts one or more blocks in free-floating fashion without need for any hardware or tools; and that in addition serves as a protective guard for the block and its terminals.

Accordingly, a prime object of the invention is to reduce the material costs of connector block support members used with arrays of plug-in type circuit packages.

A further object of the invention is to save labor costs in assembling such items by substantially shortening the time needed to mount connector blocks in frames.

An added object of the invention is to eliminate all mounting details such as springs, bolts, etc., heretofore needed to mount connector blocks.

These and other objects of the invention are achieved by a connector holder molded as a unitary structure from a resilient plastic material which includes as part of its molded structure, all necessary mounting details for support of the connector block as well as support of itself upon the frame.

According to the invention, an elongated holder body includes a pair of tongues molded at the top and bottom which snap-mount around mating bosses provided on the carrier or frame. An inner chamber on each holder formed by the side and front walls thereof include a number of wedge-shaped lips through which the connector block may be forced and, once behind them, retained. Extension of either or both of the side walls of the holder provides needed protection for the connector block terminals at a very low added cost.

One suitable material of which the connector holder may be molded is acrylonitrite-butadiene-styrene which is commercially available. Many other plastics, however, have the requisite strength and resiliency.

A feature of the invention therefore relates to a connector block holder molded from a resilient material and having a set of molded resilient tongues which engage bosses provided on a carrier to place the holder in precise and rigid alignment with guide channels on the carrier.

An added feature of the invention concerns a plurality of inner lips molded as an integral part of the described resilient connector support structure, which retain in free-floating fashion one or more connector blocks.

These and other objects and features of the invention are set forth in the detailed description to follow of an illustrative embodiment thereof and in the drawing in which.

Figure 1:
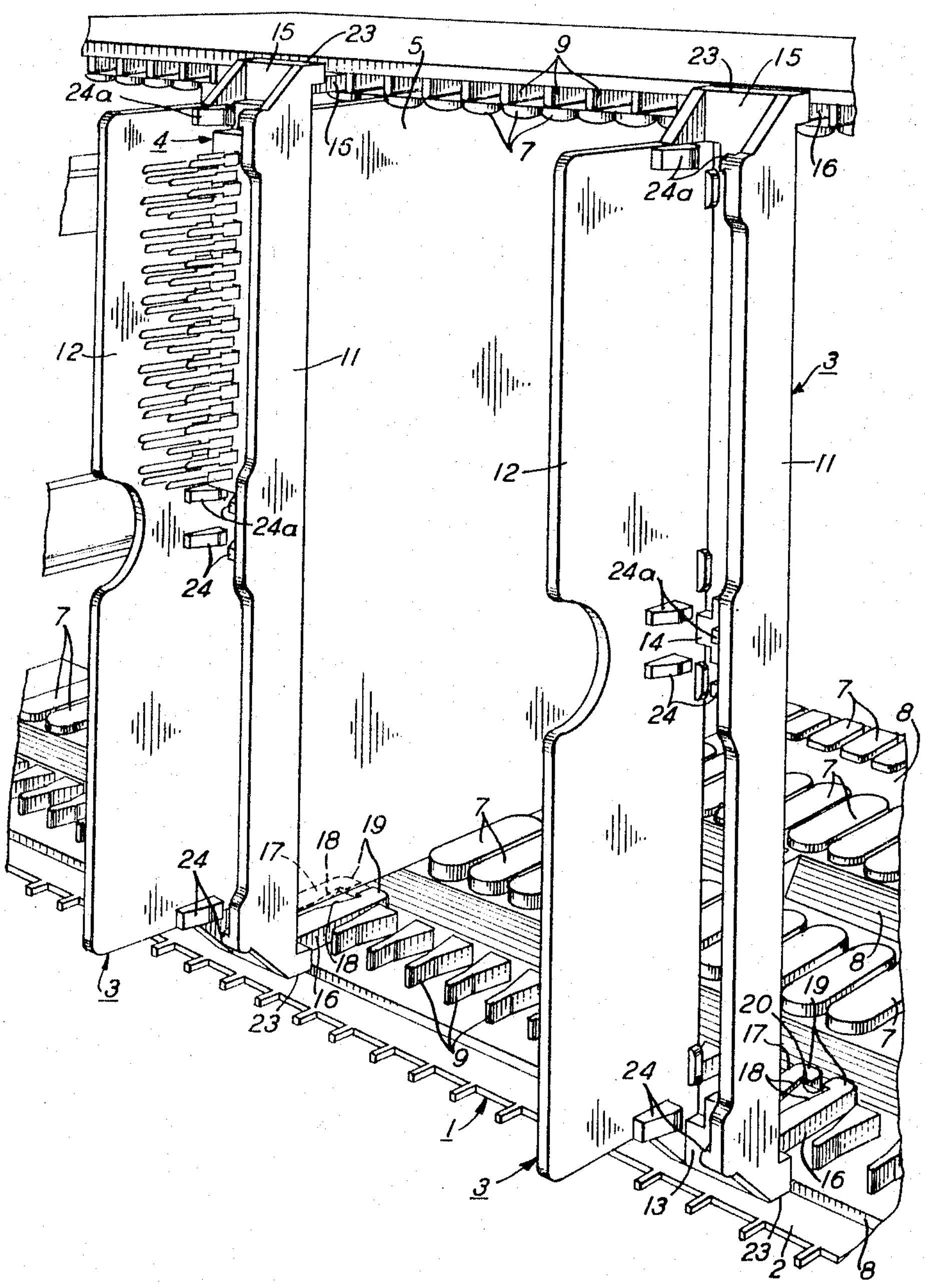
FIG. 1 is a perspective view of a circuit board carrier or frame showing the inventive connector holders mounted upon the rear thereof.
Figure 2:
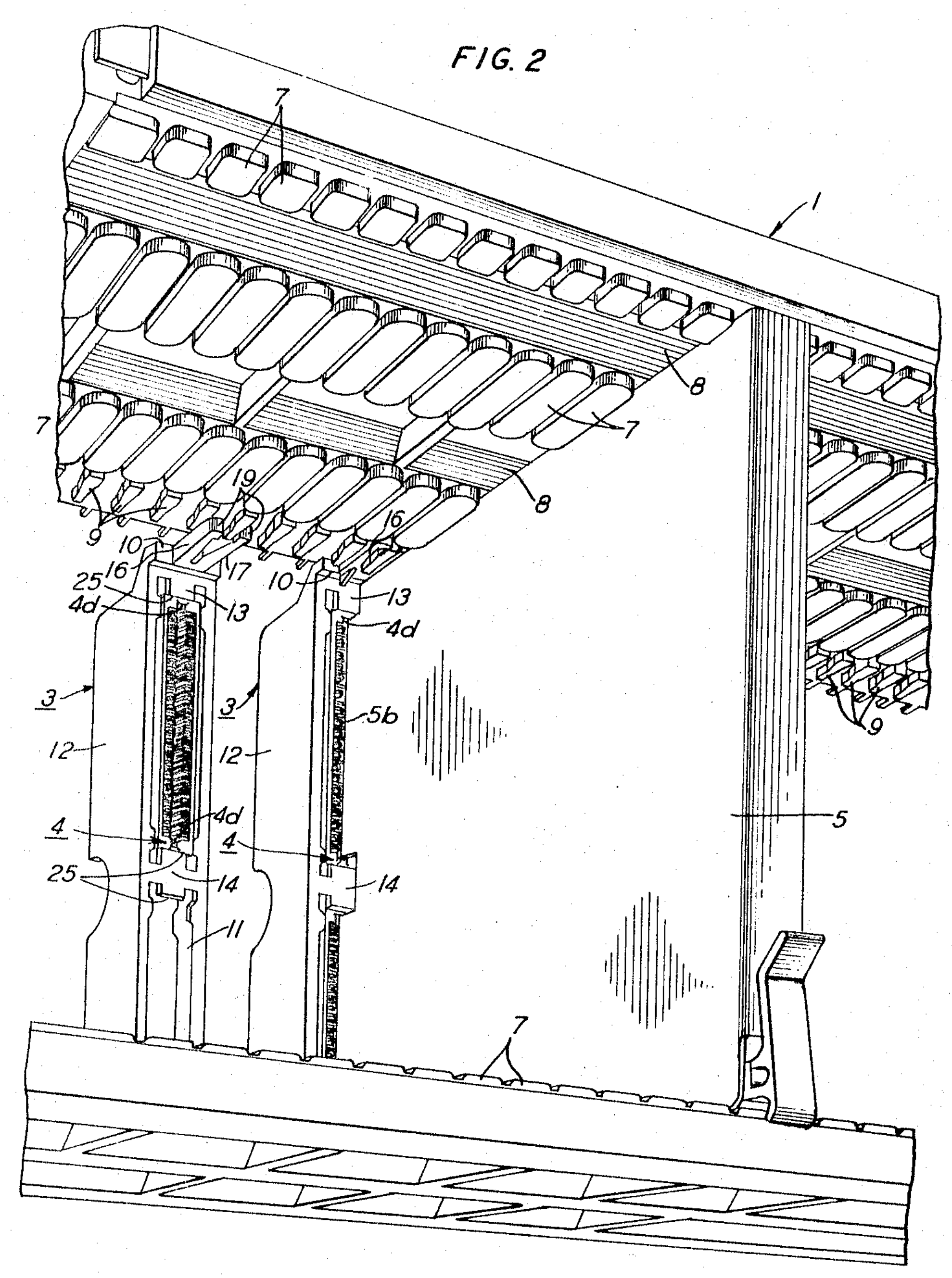
FIG. 2 is a second perspective view as seen from the front of a carrier, showing the inventive holders mounted thereon and illustrating the mounting of connector blocks in the holders.

As shown in FIG. 1, a carrier assembly 1 for insert-mounted printed wiring boards includes basically the carrier 2, the novel connector block holder 3 (two shown), connector blocks 4 mounted in the holder, and boards 5 of mounted electronic circuitry guidably retained in the holders in conventional fashion. Typically, five to ten or more such carrier assemblies make up a given item of electronic equipment as, for example, a telephone PBX; and in each assembly two dozen or more circuit boards are mounted in guide slots or grooves. The carriers themselves are open box-like structures which advantageously are die-cast. In such case, as shown in FIGS. 1 and 2, a large plurality of spaced, raised barrels 7 die-cast integrally with cross-arms 8 of carrier 2 define a number of parallel slots which accommodate in parallel relation the inserted boards 5.

Figure 3:
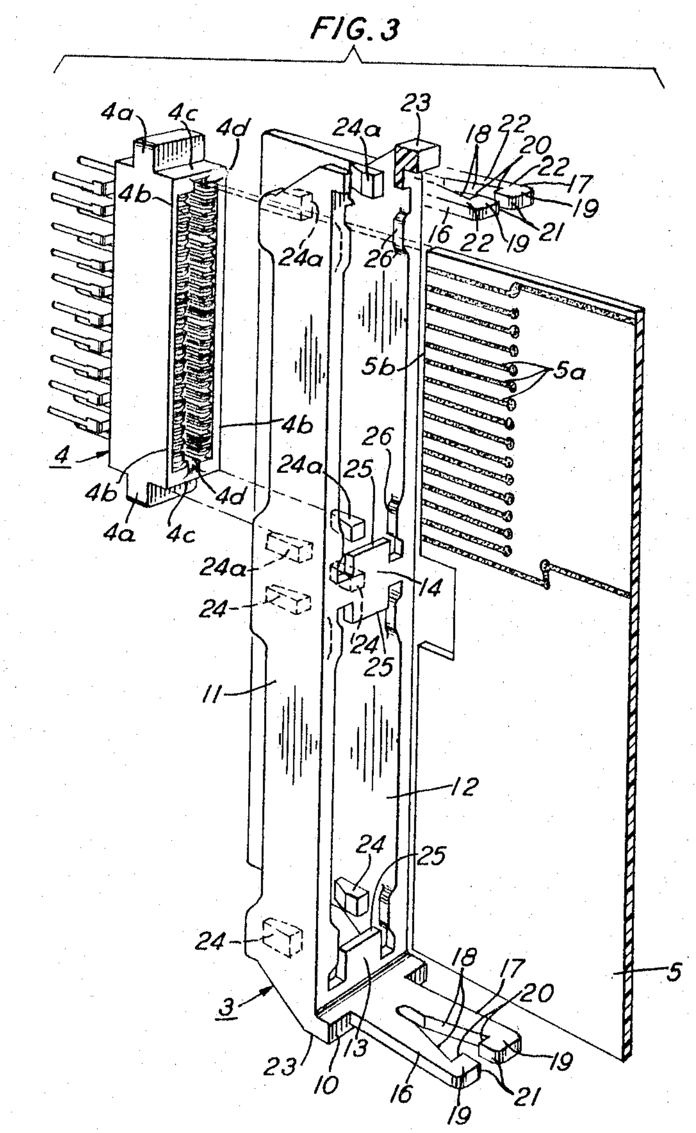
FIG. 3 is a side perspective view of the holder showing the mounting details.

Pursuant to the invention, each holder 3 comprises two elongated side walls 11, 12 joined advantageously at the middle and both ends by molded flanges 13, 14, 15. To each of the end flanges 13, 15 is molded a pair of opposed arms or tongues 16, 17. Each tongue has a tapered inner surface 18 and culminates in an in-turning hook 19. The inner surface 20 of each hook 19 is substantially flat and at right angles to the adjacent portion of surface 18. The outer surface of each hook 19 is rounded at edge 21 for reasons to be noted. The outwardly-facing surface 22 of each tongue 16, 17 is disposed in the same plane, as indicated in FIG. 3. End flanges 13, 15 extend slightly beyond this plane at each end, to form butting surfaces 23.

The fastening of holder 3 to carrier 2 is achieved with the aid of tapered bosses 9 which are positioned, during die-casting of the carrier, e.g., in register with each guide slot as shown in FIG. 1. Each holder is placed with each of its two pairs of tongues straddling a respective boss end portion and forced into the frame. The curved edges 21 of hooks 19 pass over the narrow near end of boss 9, and the wedge action thereof separates the opposing tongues 16, 17. The tongues of each pair finally clear the far end of boss 9 whereupon their hooked portions spring together and the tongues envelop the boss. At this point, the edge surface 10 of both flanges 13, 15 butts against the edge of the frame, to complete the locking-in of holder 3. The holder may be removed by wedging a screw-driver between the edges 21 and pulling the sides rearwardly.

The free-floating retention of a connector block 4 within holder 3 is accomplished, pursuant to another aspect of the invention, in the following fashion. With the aid of FIGS. 1 and 3, it may be seen that several wedge-shaped lips 24 are molded to side walls 11, 12. Lips 24 are located in groups, for example, groups of four, such as the group comprising the four lips marked 24*a* as shown in FIG. 3. Co-operating with this group are extensions 25 of end flange 15 and of center flange 14; and also nubs 26 projecting from the rear of the side walls 11, 12 inner surfaces. A connector block 4, which conventionally includes end flanges 4*a*, is inserted from the rear of holder 3 into lips 24*a*. End flanges 4*a* which are used normally for screw fastening, contact lips 24*a* at the wedge surfaces thereof, forcing the lips, as well as walls 11, 12, apart. When flanges 4*a* clear lips 24*a*, the latter snap back toward each other due to the resilience of the material of which the holder is molded.

Once in place, the side portions 4*b* of block 4 are loosely confined in side movement by nubs 26 which are spaced a slightly greater distance apart than the width dimension of block 4. Vertical freedom of movement is governed by the extensions 25 which impinge upon end surfaces 4*c* of block 4. Finally, in-out movement of end flanges 4*a* of block 4 is limited by the inner surfaces of extensions 25 and the inner surfaces of lips 24*a*. In this fashion each block 4, once snap-inserted into holder 3, enjoys three degrees of freedom. Precise alignment of wiring board contact fingers 5*a* with corresponding connector contacts of block 4 is now effected by conventional means during insertion, such as wedge action of board end 5*b* into mating tapered grooves 4*d* of block 4.

Pursuant to another aspect of the invention, either of the sides 11, 12, may be extended rearward to serve as a buffer between adjacent connections, as illustrated in FIG. 1. The only additional cost is that of the extra resilient material. The molding of holder 3 may be accomplished by any well-known plastic molding process.

As the only motions needed to place the blocks in the holder and in turn the holder onto the carrier are simple thrusts, it is readily seen that the holder lends itself well to automated mounting. This fact is a prime advantage of the invention.

One illustrative embodiment of the inventive concept has been shown and described. It is to be expressly understood that various changes and modifications may be made without departing from the spirit and scope of the invention.

What is claimed is:

1. In a carrier assembly for printed circuit boards or the like, including top and bottom frames having a plurality of co-operating guide channel pairs for retaining said boards, apparatus for mounting electrical connector blocks upon said carrier comprising, in combination:

(a) a resilient molded plastic body comprising (1) a pair of elongated sides, (2) first and second flanges joining the sides at their opposite ends in spaced parallel relation, and (3) first and second pair of opposed resilient arms extending from each said joining flange rearwardly of said sides each said flange including a butting edge; and (b) boss means on said carrier in register with the inner end of each guide channel, said arm pairs being responsive to placement onto a selected pair of corresponding bosses for spreading apart and grasping said bosses, said butting edges concurrently contacting the respective edges of said first and second frames.

2. Apparatus in accordance with claim 1, further including means for loosely retaining at least one electrical connector in free-floating fashion within said body.

3. Apparatus in accordance with claim 1 wherein said sides and said first and second end flanges define a retaining compartment for an electrical connector block, said compartment comprising:

(a) wedge means integrally molded with and extending out from said sides responsive to insertion of a connector block into said compartment for yieldably separating and spreading said sides apart and further responsive to full insertion of said block for closing behind said block; and (b) protruding means integrally molded with said sides for allowing said block a limited freedom of longitudinal movement within said compartment;

said sides being spaced apart slightly more than the width of said connector block to allow same a limited freedom of sideways movement within said compartment, and said end flanges and said wedge means being spaced apart slightly more than the depth of said connector block to allow said block a limited freedom of in-out movement within said compartment.

4. Apparatus in accordance with claim 3 wherein the arms of each said arm pair further comprise opposed inwardly-extending hook portions responsive to full insertion of said arm pairs onto said bosses for closing around and locking onto said bosses thereby to affix said body onto said carrier frame.

5. Apparatus in accordance with claim 1 wherein said body further comprises one or more additional flanges intermediate said end flanges joining said sides, said end flanges and intermediate flanges defining a plurality of compartments along the length of said body, each bounded by two adjacent joining flanges and the portion of said sides contained between them, and each compartment having a defined length, width and depth governed by the dimensions of a particular size electrical connector block intended to fit therein.

6. Apparatus in accordance with claim 5 wherein each said compartment further comprises:

(a) wedge means integrally molded with and extending out from said sides responsive to insertion of a connector block into said compartment for yieldably separating and spreading said sides apart and further responsive to full insertion of said block for closing behind said block; and (b) protruding means integrally molded with said sides for allowing said block a limited freedom of longitudinal movement within said compartment;

said sides being spaced apart slightly more than the width of said connector block to allow same a limited freedom of sideways movement within said compartment, and said end flanges and said wedge means being spaced apart slightly more than the depth of said connector block to allow said block a limited freedom of in-out movement within said compartment.

7. Apparatus in accordance with claim 6 wherein the arms of each said arm pair further comprise opposed inwardly-extending hook portions responsive to full insertion of said arm pairs onto said bosses for closing around and locking onto said bosses thereby to affix said body onto said carrier frame.

8. Apparatus in accordance with claim 7 wherein said wedge means for each compartment comprises a first set of two spaced lips molded onto one of said side portions of said compartment and a second set of spaced lips molded onto the other of said side portions of said compartment in alignment with said first set.

9. Apparatus in accordance with claim 8 wherein said body is fabricated from the material acrylonitrite-butadiene-styrene.

References Cited by the Examiner

UNITED STATES PATENTS

| | | | |
|---|---|---|---|
| 2,951,185 | 8/1960 | Buck | 324—73 X |
| 3,179,738 | 4/1965 | De Lyon | 339—128 X |

References Cited by the Applicant

UNITED STATES PATENTS

| | | |
|---|---|---|
| 2,911,609 | 11/1959 | Burtt et al. |
| 2,976,510 | 4/1961 | Blain. |
| 3,231,785 | 1/1966 | Calabro. |

ROBERT K. SCHAEFER, *Primary Examiner.*

M. GINSBURG, *Assistant Examiner.*